March 15, 1932. E. DODSON 1,849,059
METHOD OF AND MEANS FOR SUPPLYING FUEL
Filed Nov. 6, 1930   3 Sheets-Sheet 1
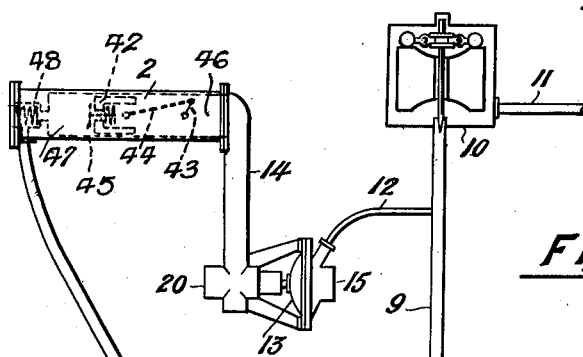
Fig. 1.
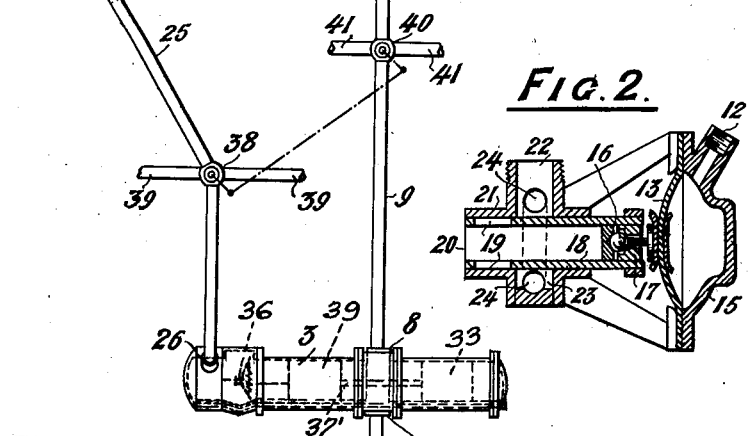
Fig. 2.
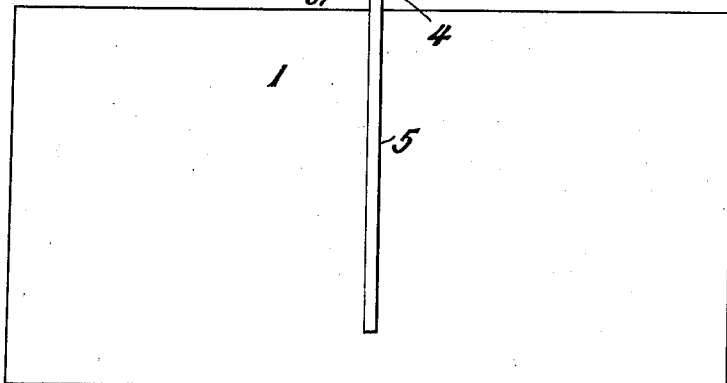
Inventor
Edward Dodson.
by Moses & Nolte
Atty's

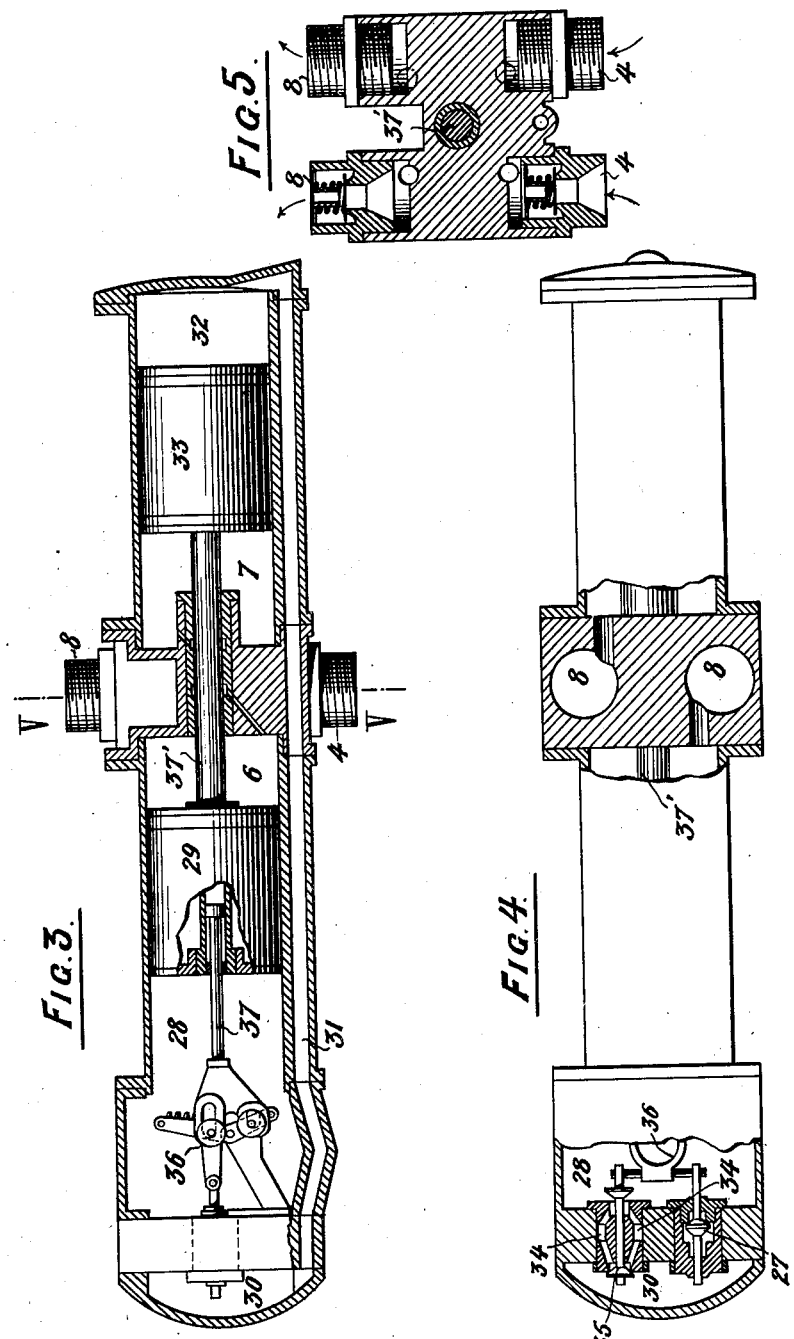

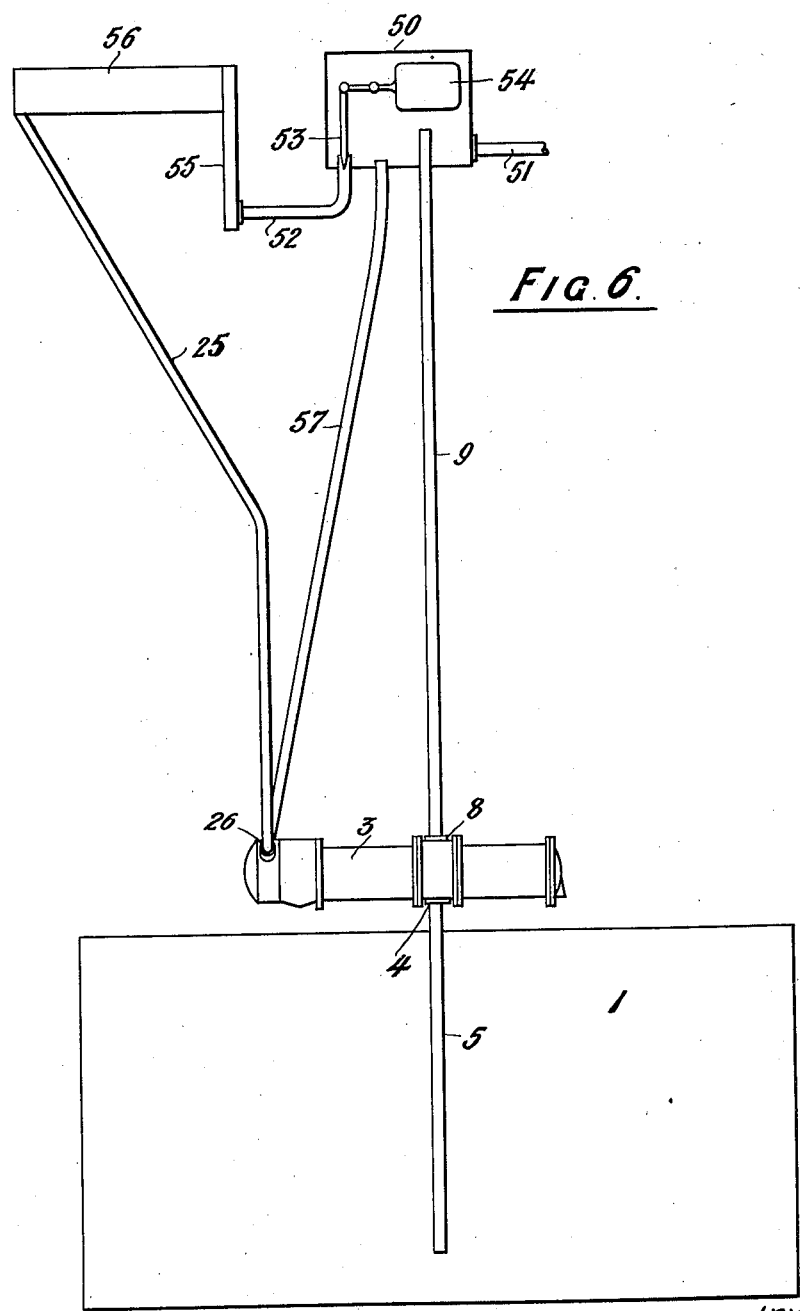

Patented Mar. 15, 1932                                                            1,849,059

UNITED STATES PATENT OFFICE

EDWARD DODSON, OF STREATHAM, LONDON, ENGLAND

METHOD OF AND MEANS FOR SUPPLYING FUEL

Application filed November 6, 1930, Serial No. 493,771, and in Great Britain February 26, 1930.

This invention relates to a method of supplying liquid fuel or other fluid from a source of supply to a delivery point at or adjacent to a source of power remote from said source of supply and is particularly applicable to the supply of petrol or other fuel from a supply tank to an internal combustion engine remote from said tank. The invention also relates to the means employed for carrying out this method.

This invention is especially applicable to the supply of liquid fuel to aircraft engines where the fuel is stored in a tank remote from the engine, in which supply difficulties are encountered due to the forces acting on the fuel in the conduits, varying according to the position of the machine in space and to its speed, and also to the necessity for keeping the various parts of the supply system as light, in weight, as possible. Hitherto, the fuel has been fed from the fuel tank to the engine by means of suction from the engine or by means of pressure exerted on the fuel in the tank, or by means of pumps driven independently of the internal combustion engine. All these known systems, however, are disadvantageous. The feeding by suction from the engine is unsatisfactory because suction causes air and vapour locks; because slight leakage would make the suction ineffective; because gravitational and other forces acting on the fuel will vary with change in position of the aircraft in space; and because the suction effect may be out of proportion to the demands of the engine so as to supply a greater or a lesser quantity of fuel than is actually required by the engine. The supply of fuel by pressure exerted on the fuel in the tank is disadvantageous in that it increases any loss due to leakage and the fuel tanks require to be strong to withstand considerable pressure which would be impracticable for considerations of weight. Independently driven pumps have numerous disadvantages, for instance, wind-mill driven fuel pumps, as used in fast aircraft, cause too much drag, and at high altitudes where the air is not dense, and the machine speed is low, they sometimes fail altogether.

These disadvantages are overcome by a method of feeding fluid from a supply source to a delivery point at or adjacent to a source of power remote from said source, in accordance with this invention, which method consists in operating by fluid pressure from said source of power a pressure feed device located at or adjacent to said supply source, causing said pressure feed device to draw fluid from said supply source without placing the fluid at said source under pressure and forcing the fluid so drawn into the pressure feed device, from said device to the delivery point under pressure. The pressure or amount of the liquid fuel or other fluid forced from the fuel tank or source is utilized to control the fluid pressure supplied from the internal combustion engine or other source of power to the pressure feed device, so that the fluid pressure is varied in accordance with the fluid supplied, thus compensating for variation in the supply of the fluid due to extraneous forces, such as the change in position of aircraft in space or variation in the consumption of fuel by the engine.

The means for carrying out this method may comprise an air or other compression pump driven by the source of power and supplying fluid under pressure to a fluid pressure driven pump located at or adjacent to the source of supply, which fluid driven pump draws fluid from said source of supply without placing said fluid at the source under pressure and forces under pressure the fluid so drawn into the fluid driven pump to the source of power or to an auxiliary vessel or a float chamber of a carbureter associated therewith. Means may be provided which is operated by the pressure or amount of liquid fuel or other fluid to decrease the fluid pressure supplied to the fluid pressure driven pump with increase, above normal, in pressure or amount of the fluid from the source of supply and to increase the supply of fluid pressure to the fluid pressure driven pump on decrease, below normal, in the pressure or amount of the fluid from the source of supply.

The invention will now be described with reference to two embodiments of the means for carrying out this invention illustrated upon the accompanying drawings, in which, Fig. 1 illustrates diagrammatically one embodiment of the means, in which air is used as the pressure fluid for driving the fluid driven pump.

Fig. 2 is a sectional elevation of the means for controlling the air inlet to the engine driven air pump.

Fig. 3 is a sectional elevation of the air driven fuel pump itself, drawn to an enlarged scale, but showing the valve mechanism in elevation.

Fig. 4 is a plan view of the air driven fuel pump with parts thereof in section to illustrate the valve mechanism.

Fig. 5 is a cross-sectional view on the line V—V in Fig. 3, illustrating the fuel valve mechanism.

Fig. 6 is a similar view to Fig. 1, but illustrating a further embodiment in which part of the liquid fuel itself is used as the pressure fluid.

In the embodiment shown in Fig. 1, which illustrates the means for carrying out this invention, as applied to the supply of fuel from a fuel tank 1, it may be, for instance, located in the float of a seaplane (not shown) to an internal combustion engine (not shown) mounted in the fuselage of the seaplane, an engine driven air pump 2 is connected to an air driven fuel pump 3 located adjacent the fuel tank 1. This air driven fuel pump is constructed as described in the co-pending United States application Serial No. 493,772 and as shown in Figs. 3 to 5 with non-return inlets 4 through which fuel from the tank 1 is drawn by means of the pipe 5 into spaces 6 and 7 in the fuel pump and is also provided with non-return outlets 8 through which the fuel drawn into the fuel pump will be forced through the pipe 9 into the float chamber 10 to a carbureter from which float chamber the fuel is supplied through the supply pipe 11 to the internal combustion engine in the ordinary way. Two non-return inlets and two non-return outlets are provided which are conveniently connected to a single inlet pipe 5 and a single outlet pipe 9. The outlet pipe 9 from the fuel pump to the float chamber is provided with a by-pass passage 12 to a diaphragm 13 (Fig. 2) operating a valve for controlling the air intake 14 to the air pump 2 so as to decrease the air passing to the air pump with increase of pressure above normal in the fuel supply to the float chamber and to increase the air supply to the air pump on decrease below normal in the pressure of said liquid fuel supplied to the float chamber. The diaphragm 13 of this pressure operated valve is fixed to a casing 15 and forms with said casing a closed chamber, with which the by-pass 12 communicates. On its outside this diaphragm 13 is connected by means of a ball 16 and socket joint 17 to a slide valve 18 of hollow tubular form having diametrally arranged holes 19 and having one end of its bore open at 20 for the inlet of air to said holes 19. The valve casing 21 is provided with a valve outlet port 22 in one side which is opened and closed by movement of the slide valve 18 in accordance with the pressure of the fuel upon the diaphragm 13. When the valve is open air is drawn in through the open end 20 of the slide valve 18 and passes through one of the holes 19 in the slide valve and the valve outlet port 22 to the intake 14 of the air pump 2. In order to equalize the pressure on both sides of the slide valve 18 and thus facilitate its movement, a space 23 is provided in the valve casing diametrally opposite the outlet port 22, said space having a semiannular passage 24 connecting it with the outlet port 22.

The air pump 2 contains a piston 42 driven by the engine through a crank 43 and connecting rod 44, said piston having a non-return valve 45, which, on the inward stroke of the piston, allows air from the intake 14 to pass from the crank chamber 46 into the compression space 47, where, on the outward stroke of the piston, the air is compressed until it overcomes the spring loaded non-return outlet valve 48.

The air passing into the intake 14 is thus compressed by the air pump 2 and is forced under pressure through the pipe 25 to an air inlet 26 on the pump. This air passes through an air inlet valve 27 in the fuel pump either to the space 28 at one side of the piston 29, or through the space 30, transfer passage 31 to the space 32 at the opposite side of the other piston 33 of the fuel pump, according to the position of the inlet valve. Air is exhausted from the space 28 through outlet passages 34 and from the space 32, transfer passage 31 and space 30 and outlet passages 34, as determined by the position of an exhaust valve 35. The inlet valve 27 and the exhaust valve 35 are operated by trip mechanism 36 connected by a rod 37 to the piston 29 so that these inlet and exhaust valves are opened and closed in accordance with the movements of the piston. The piston 29 and piston 33 are interconnected by a push rod 37'.

The pipe 25 connecting the air pump 2 of the fuel pump 3 may be provided with a selective cock 38 (Fig. 1) for connection to any one of a number of fuel pumps through the pipes 39, and similarly the pipe 9 supplying fuel to the float chamber may be provided with a selective cock 40 for connection to any one of a number of fuel pumps by the pipes 41. The cocks 38 and 40 may be interconnected as indicated by chain dotted lines in Fig. 1.

In a further embodiment illustrated in Fig. 6 also adapted for supplying fuel from a fuel tank 1 located, for instance, in the float of a seaplane, to the internal combustion engine in the fuselage of the seaplane, but being adapted to use part of the fuel for the purpose of actuating the pump 3, similar parts are connected by like reference to those used in Fig. 1 so that only the modifications necessary for adapting the system to pressure liquid will be described. In this case the fuel from the fuel pump 3 is supplied to an auxiliary chamber 50 from which it is supplied to the float chamber of a carbureter in known manner through the pipe 51. Fuel from this auxiliary chamber 50 is also supplied through a pipe 52 controlled by a valve 53 and float 54 to the intake 55 of an engine driven liquid pump 56. The liquid is compressed by the pump and is forced under pressure through the pipe 25 to the fuel pump where it acts in exactly the same manner as the air used in Fig. 1, but instead of exhausting to atmosphere, as in the case of air, the fuel is returned through the pipe 57 to the auxiliary chamber 50. In this case the supply of fuel to the pump 56 is regulated in accordance with the amount of fuel in the auxiliary chamber by means of the float 54 and valve 53 so as to increase the supply of fuel with a decrease below normal in the amount of fuel in said chamber, and to decrease the supply of fuel from the fuel pump to said chamber on an increase above normal of the quantity of fuel in said chamber.

The air or other fluid driven fuel pump may be actually mounted in the fuel tank instead of being located adjacent to the said tank.

Both the engine driven air pump and the fuel pump valves may be lubricated by oil mist laden air from the engine crank-case.

The advantages to be derived from this method of supplying fuels are many, among them being freedom from gas locks, which readily occur when volatile fuels are subjected to low pressures.

In this connection it must be remembered that considerable forces act on the fuel in the conduits in fast aircraft during acceleration and manœuvres; in many cases of a magnitude sufficient to break the liquid column in the fuel pipes, and cause a cessation of fuel supply to the engine, with serious consequences.

The majority of the fuel pumps in use on aero engines will not lift unless primed, and therefore, when once filled with gas by reason of the column of fuel being broken, (for instance by centrifugal force during high speed turns), the pump will not start working again when the turn ceases, owing to gas locks, which condition will usually be exaggerated by engine heat conducted to the pump.

In connection with military aircraft, this invention will enable the fuel tanks to be dispersed and divided, each having its own fuel supply thus ensuring comparative immunity from stoppage due to damage by gun fire.

In other cases all the tanks, whether high or low, can be connected to a single fuel pump if desired, either through a multi-way cock, or direct, but to avoid vapor and air locks, the pump should be at about the lowest part of the fuel system.

Although certain specific types of pump and pressure control have been described, the invention is not confined to these, as obviously mechanical equivalents, such as the substitution of bellows, diaphragms and the like for pistons, and pump operated by crank levers and the like, instead of the direct coupled pistons, could be used, and still come within the scope of this invention.

When the fluid used to transmit power from the engine driven pump is air, this is preferably warmed to prevent freezing on expansion. It may, in certain cases, be preferable to use a fluid such as the normal engine fuel, which can be circulated from or to a float controlled auxiliary or reserve tank which is situated above the engine driven pump. The fuel is supplied at a relatively high level in this reserve tank, in order that there may be always liquid in it; the outlet to the carbureters or the like is also situated high enough to be incapable of draining the tank.

The outlet to the engine driven pump is controlled by a float and valve, so as to cut off the liquid supplied to the engine driven pump when the fuel pump has raised the level to a pre-determined height.

At present owing to the very wide variations in head to which the float chamber of a carbureter for aircraft is subjected, the float chamber must be large and the carbureter installation is correspondingly difficult.

Because this invention enables the fuel feed to the carbureters to be kept at more nearly a constant pressure, the carbureter needle valve and float may be kept small, and the fuel level in the float chamber kept more nearly constant, and the carbureter will be rendered practically insensitive to machine altitude.

This invention has been described and explained mainly as regards its use on an aircraft fuel feed system, but it could obviously be used in other cases where the liquid pump is required to operate remote from the source of power, such as, for instance, in trimming an airship by shifting ballast or fuel from one tank to another. It could also be used in deep wells.

What I claim as my invention and desire to secure by Letters Patent is:—

1. A method of feeding fluid from a supply source to a delivery point at or adjacent to a source of power remote from said supply source, consisting in operating by fluid pressure from said source of power a pressure feed device located at or adjacent to said supply source, causing said pressure feed device to draw fluid from said supply source without placing the fluid at said source under pressure, forcing the fluid, so drawn into the pressure feed device, from said device to the delivery point under pressure and causing the pressure of the fluid forced to said delivery point to control the fluid pressure supplied to said pressure feed device, so as to decrease the fluid pressure supplied to said pressure feed device with increase in the pressure of the fuel forced to the delivery point and vice versa.

2. A method of feeding fluid from a supply source to a delivery point at or adjacent to a source of power remote from said supply source, consisting in operating by fluid pressure from said source of power a pressure feed device located at or adjacent to said supply source, causing said pressure feed device to draw fluid from said supply source without placing the fluid at said source under pressure and forcing the fluid, so drawn into the pressure feed device, from said device to a receiver at the delivery point under pressure and causing the amount of fluid in the receiver to control the fluid pressure supplied to said pressure feed device, so as to decrease the fluid pressure with increase in fluid in the receiver and vice versa.

3. Means for feeding fluid from a supply source to a delivery point at or adjacent to a source of power remote from said supply source comprising a compression pump driven by the source of power, a fluid pressure driven pump located at or adjacent to the source of supply and driven by fluid pressure from said compression pump, means in said fluid pressure driven pump for drawing fluid from the supply source without placing said fluid at the supply source under pressure and forcing under pressure the fluid so drawn to the delivery point, and means operable by the pressure of said fluid forced under pressure to the delivery point to decrease the fluid pressure supplied to the fluid pressure driven pump with increase in the pressure of fluid forced to the delivery point and vice versa.

4. Means for feeding fluid from a supply source to a delivery point at or adjacent to a source of power remote from said supply source comprising a compression pump driven by the source of power, a fluid pressure driven pump located at or adjacent to the source of supply and driven by fluid pressure from said compression pump, means in said fluid pressure driven pump for drawing fluid from the supply source without placing said fluid at the supply source under pressure and forcing under pressure the fluid so drawn to the delivery point, a receiver at said delivery point, and means operable by the fluid in said receiver to decrease the fluid pressure supplied to the fluid pressure driven pump with increase in the pressure of fluid forced to said receiver and vice versa.

5. Means for feeding fluid from a supply source to a delivery point at or adjacent to a source of power remote from said supply source comprising a compression pump driven by the source of power, a fluid pressure driven pump located at or adjacent to the source of supply and driven by fluid pressure from said compression pump, means in said fluid pressure driven pump for drawing fluid from the supply source without placing said fluid at the supply source under pressure and forcing under pressure the fluid so drawn to the delivery point, and a pressure actuated valve to increase or decrease the fluid passing to the compression pump in accordance with the variation in pressure of fluid passing to the delivery point.

6. Means for feeding fluid from a supply source to a delivery point at or adjacent to a source of power remote from said supply source comprising a compression pump driven by the source of power, a fluid pressure driven plump located at or adjacent to the source of supply and driven by fluid pressure from said compression pump, means in said fluid pressure driven pump for drawing fluid from the supply source without placing said fluid at the supply source under pressure and forcing under pressure the fluid so drawn to a receiver at the delivery point, means for supplying fluid from said receiver to the compression pump so that some of the fluid from the supply source is used to convey fluid pressure to the fluid pressure driven pump and means for returning the fluid so used to said receiver.

7. Means for feeding fluid from a supply source to a delivery point at or adjacent to a source of power remote from said supply source comprising a compression pump driven by the source of power, a fluid pressure driven pump located at or adjacent to the source of supply and driven by fluid pressure from said compression pump, means in said fluid pressure driven pump for drawing fluid from the supply source without placing said fluid at the supply source under pressure and forcing under pressure the fluid so drawn to a receiver at the delivery point, means for supplying fluid from said receiver to the compression pump so that some of the fluid from the supply source is used to convey fluid pressure to the fluid pressure driven pump, means for increasing or decreasing the fluid supplied to the compression pump in accordance with the amount of fluid in said receiver and means for returning the fluid so used to the receiver.

In witness whereof I have hereunto set my hand.

EDWARD DODSON.